(12) United States Patent
Jiang et al.

(10) Patent No.: US 7,952,999 B1
(45) Date of Patent: May 31, 2011

(54) FEEDBACK CONTROL OF PROCESSOR USE IN VIRTUAL SYSTEMS

(75) Inventors: Dongyi Jiang, Milpitas, CA (US); David Yu, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 363 days.

(21) Appl. No.: 11/745,707

(22) Filed: May 8, 2007

(51) Int. Cl.
*H04L 29/02* (2006.01)
(52) U.S. Cl. .................................. 370/229; 370/235
(58) Field of Classification Search .................. 370/229, 370/235
See application file for complete search history.

(56) References Cited

U.S. PATENT DOCUMENTS

| | | | |
|---|---|---|---|
| 6,687,220 B1* | 2/2004 | Ayres | 370/229 |
| 7,206,282 B1* | 4/2007 | Goldman et al. | 370/230 |
| 2005/0257256 A1* | 11/2005 | Supnik et al. | 726/11 |
| 2007/0011627 A1* | 1/2007 | Dennison et al. | 716/1 |
| 2007/0067435 A1* | 3/2007 | Landis et al. | 709/224 |
| 2007/0109968 A1* | 5/2007 | Hussain et al. | 370/232 |
| 2007/0233866 A1* | 10/2007 | Appleby et al. | 709/226 |
| 2008/0253284 A1* | 10/2008 | Montalvo et al. | 370/230 |

\* cited by examiner

*Primary Examiner* — Huy D Vu
*Assistant Examiner* — Maria Sekul
(74) *Attorney, Agent, or Firm* — Harrity & Harrity, LLP

(57) ABSTRACT

A device may receive packets for a system and obtain a packet drop rate of the system, a processor utilization rate of the system, and a target processor utilization rate of the system. In addition, the device may determine a target packet drop rate based on the packet drop rate, the processor utilization rate, and the target processor utilization rate. The device may drop a portion of the packets in accordance with the packet drop rate.

16 Claims, 10 Drawing Sheets

FEEDBACK CONTROL OF PROCESSOR USE IN VIRTUAL SYSTEMS

FIELD OF THE INVENTION

Implementations described herein relate to virtual systems, and in particular, pertain to controlling processor use in virtual systems.

BACKGROUND

Many of today's network security devices incorporate the capabilities of multiple network elements, such as routers, firewalls, switches, etc. In some of the security devices, the capabilities to partition network zones, set trusted networks, and emulate routers are combined within what is known as a virtual system in a highly distributed environment.

SUMMARY

According to one aspect, a method may comprise receiving packets at a virtual system. The method may further comprise obtaining a past packet drop rate of the virtual system, a past processor utilization rate of the virtual system, and a target processor utilization rate of the virtual system. The method may also comprise determining a target packet drop rate based on the past packet drop rate, the past processor utilization rate, and the target processor utilization rate. The method may further comprise dropping a portion of the received packets at the virtual system in accordance with the target packet drop rate.

According to another aspect, a device may comprise a control plane and a data plane. The control plane may include a function that determines a target packet drop rate of a virtual system based on an amount of processor resources consumed by the virtual system and based on runtime parameters. The data plane may include one or more of the processor resources and the virtual system. The virtual system may be configured to receive packets, and drop a fraction of the received packets based the target packet drop rate.

According to yet another aspect, a device may comprise a management module and a security port module, and an interconnect that provides communication paths between the security port module and the management module. The management module may include a first set of processors configured to determine a target packet drop rate of a virtual system based on a past processor utilization rate of the virtual system, a past packet drop rate of the virtual system, and a target processor utilization rate of the virtual system. The security port module may include the virtual system and a second set of processors. The second set of processors may be configured to receive packets at the virtual system and drop a fraction of the received packets at the virtual system based the target packet drop rate.

According to a further aspect, a device may comprise means for receiving packets for a virtual system. The device may further comprise means for obtaining a packet drop rate of the virtual system, a processor utilization rate of the virtual system, and a target processor utilization rate of the virtual system. The device may also comprise means for determining a target packet drop rate based on the packet drop rate, the processor utilization rate, and the target processor utilization rate. The device may yet further comprise means for dropping a portion of the received packets at the virtual system in accordance with the target packet drop rate.

DETAILED DESCRIPTION OF PREFERRED EMBODIMENTS

The following detailed description refers to the accompanying drawings. The same reference numbers in different drawings may identify the same or similar elements.

Figure 1:
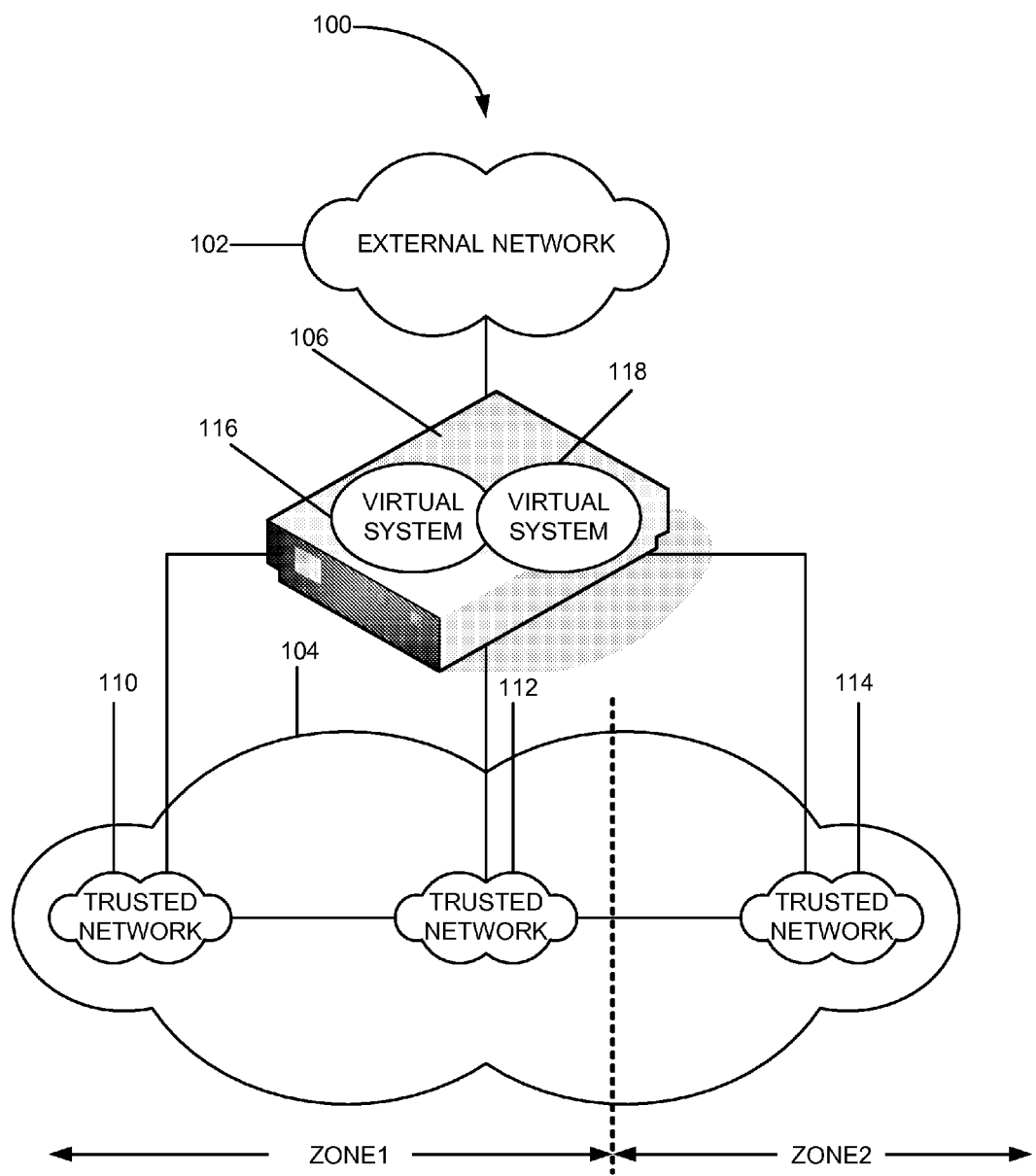
FIG. 1 shows an exemplary system in which aspects described herein may be implemented.

FIG. 1 shows a system 100 in which concepts described herein may be implemented. As shown, system 100 may include an external network 102, an internal network 104, and a security device 106.

External network 102 may include the Internet, an ad hoc network, a local area network (LAN), a wide area network (WAN), a metropolitan area network (MAN), a cellular network, a public switched telephone network (PSTN), any other network, or combinations of networks. Internal network 104 may include a corporate network, an intranet, a LAN, a WAN, and/or any combinations of networks that securely share part of an organization's information with those inside or outside internal network 104. Security device 106 may include a device for securing internal network 104 and may protect internal network 104 from viruses and/or attacks from external network 102.

As shown in FIG. 1, internal network 104 may include trusted networks 110, 112, and 114 and security zones, ZONE1 and ZONE2. A trusted network may operate as an independent logical network that includes computers and/or network elements that behave as if they are connected to the same wire or are affiliated with one another, even though the computers and/or the network elements may belong to different partitions of a network. A security zone may include a logical grouping of interfaces, sub-interfaces, Internet Protocol (IP) hosts, and subnets that share security access controls and settings. In FIG. 1, trusted networks 110 and 112 may contain security zone ZONE1 and trusted network 114 may contain security zone ZONE2.

As shown in FIG. 1, security device 106 may include virtual systems (VSYSs) 116 and 118. Each VSYS 116/118 may include hardware and/or software for partitioning internal network 104 that is connected to security device 106 into trusted networks 110-114 and security zones ZONE1 and ZONE2. In addition, VSYS 116/118 may enforce security policies to packets that flow to/from ZONE1, ZONE2, and external network 102.

In FIG. 1, security device 106 may include more than one VSYS that consumes processor time. In such a device, it is possible to control the allocation of processor time to different VSYSs. In implementations described below, processor time may be allocated to different VSYSs based on information about processor utilization for each VSYS. The implementations may allow each VSYS to maintain its performance level under network congestion or under a malicious attack; allow the VSYSs to maximize the overall use of processor time; allow each VSYS to use its fair share of processor time, especially in highly distributed systems; allow the VSYSs to recover quickly after the VSYSs experience a congestion; allow each VSYS to accurately predict and effectively control processor use at runtime; and allow each VSYS to transition from one runtime state to another state as smoothly as possible.

Figure 2:
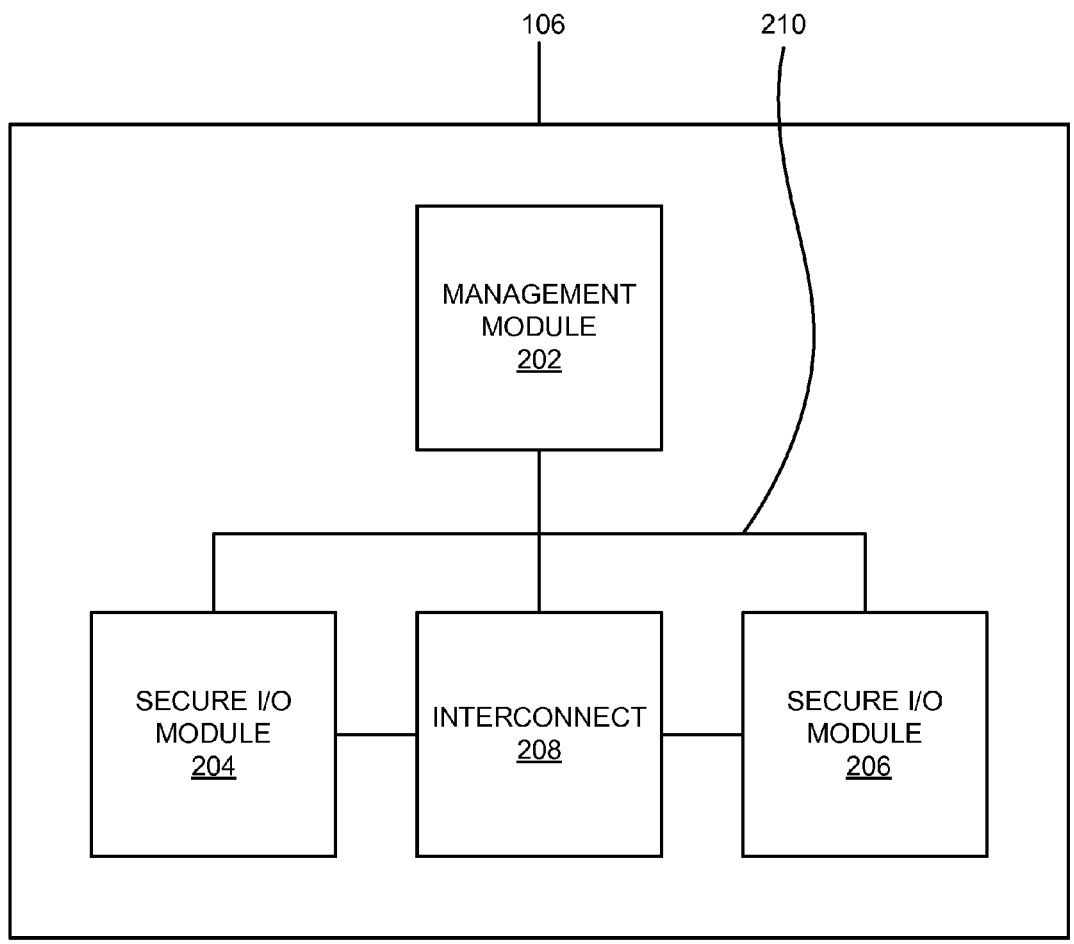
FIG. 2 is an exemplary block diagram of the security device of FIG. 1.

FIG. 2 is an exemplary block diagram of security device 106. As shown, security device 106 may include a management module 202, secure input/output modules (SIOMs) 204/206, and interconnect 208 and bus 210. In different implementations, security device 106 may include additional, fewer, or different components than the ones illustrated in FIG. 2.

Management module 202 may include devices for supporting, managing, and controlling other components (e.g., SIOMs 204/206) in security device 106. In one example, management module 202 may provide support for setting up and tearing down sessions and tunnel-related peer-to-peer communications (e.g., exchanging keep-alive packets for tunnels). In another example, management module 202 may operate in conjunction with other components of FIG. 2 to detect and mitigate attacks. For instance, to mitigate an attack, management module 202 may perform dynamic routing updates with peer routers and distribute routing changes to other components in security device 106.

SIOM 204 may include devices for processing packets that enter and exit security device 106. SIOM 204 may parse an incoming packet, classify the incoming packet, and process the packet if the packet is to flow through security device 106. If a received packet is not to flow through security device 106 (e.g., the packet contains a message to set up a session), the packet may be transferred to management module 202 for further processing. SIOM 206 may include similar device as SIOM 204 and may operate similarly.

Interconnect 208 may include switches (e.g., a switch fabric) for conveying an incoming packet from SIOM 204 to SIOM 206 based on a destination of the packet and stored path information. Bus 210 may be, for example, 32-bit peripheral component interconnect (PCI) bus or other proprietary high speed interconnect bus, and may include a path that permits communication between management module 202 and SIOMs 204/206.

Figure 3:
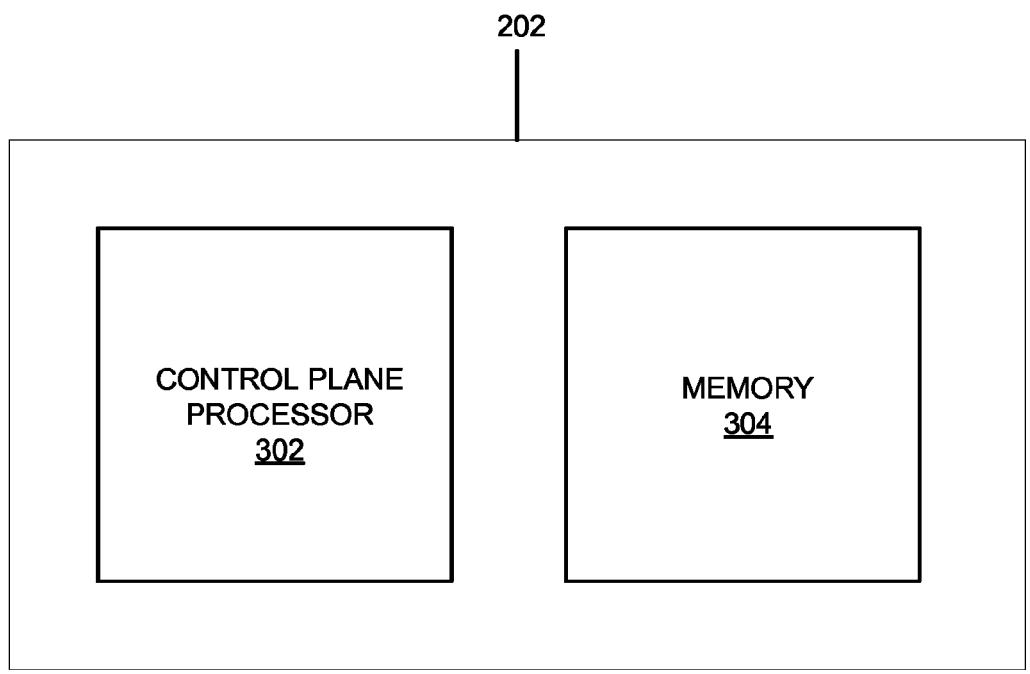
FIG. 3 is an exemplary block diagram of the management module of FIG. 2.

FIG. 3 is an exemplary block diagram of management module 202. As shown, management module 202 may include a control plane processor 302 and memory 304. Control plane processor 302 may include one or more processors, microprocessors, data processors (i.e., an application specific integrated circuit (ASIC) for processing packets that flow through a device), and/or processing logic optimized for networking and communications. Control plane processor 302 may manage, control, and support SIOMs 204/206, to process packets, security information, network path-related information (e.g., routing updates, session processing, performing Internet Key Exchange (IKE), exchanging keep-alive packets for tunnels, etc.). Memory 304 may include static memory, such as read only memory (ROM), dynamic memory (e.g., random access memory (RAM), synchronous RAM (SRAM)), and/or onboard cache, for storing data and machine-readable instructions. Memory 304 may also include storage devices, such as a floppy disk, a compact disk (CD) ROM, a CD read/write (R/W) disc, and/or flash memory, as well as other types of storage devices.

Figure 4:
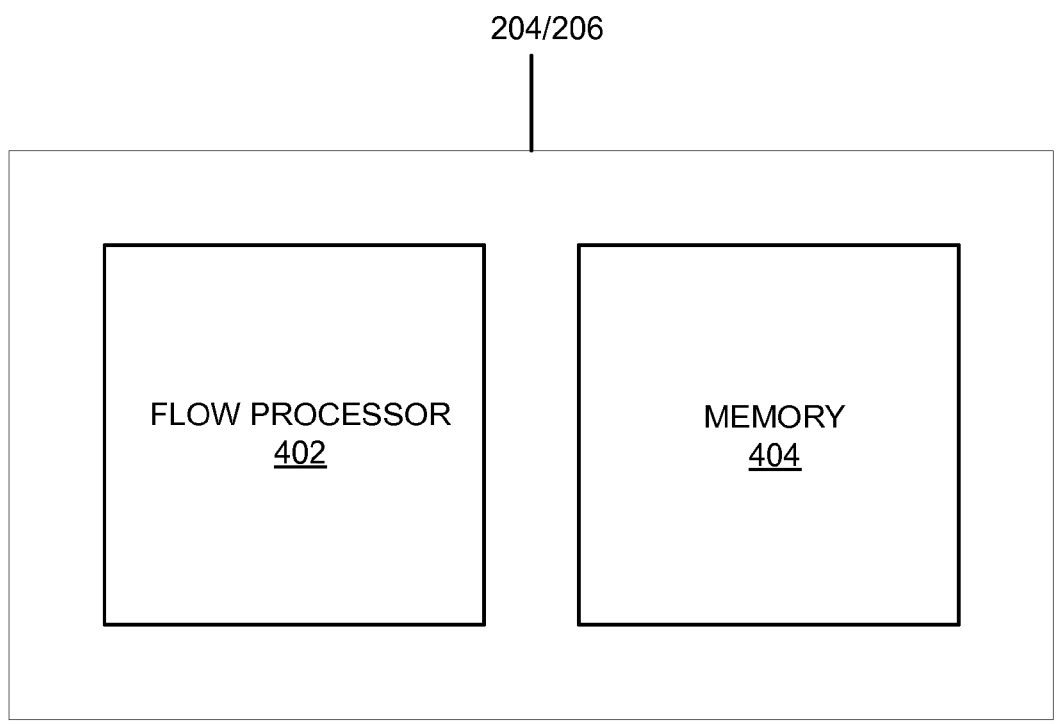
FIG. 4 is an exemplary block diagram of the secure input/output (I/O) modules of FIG. 2.

FIG. 4 is an exemplary block diagram of SIOMs 204/206. As shown, SIOMs 204/206 may include a flow processor 402 and memory 404. Different implementations may include additional, fewer or different components than the ones illustrated in FIG. 4. For example, in one implementation, SIOM 204/206 may include additional flow processors.

Flow processor 402 may include one or more processors, microprocessors, and/or processing logic for conveying packets that arrive at input ports to proper output ports and for processing the packets. Examples of packet processing include parsing, classifying, fragmenting, reassembling, encoding, and decoding the packets. Memory 404 may include static memory, such as read only memory (ROM), dynamic memory (e.g., random access memory (RAM), synchronous dynamic RAM (SRAM), SRAM), and/or onboard cache, for storing data and machine-readable instructions. Memory 404 may also include storage devices, such as a floppy disk, a CD ROM, a CD read/write (R/W) disc, and/or flash memory, as well as other types of storage devices.

Figure 5:
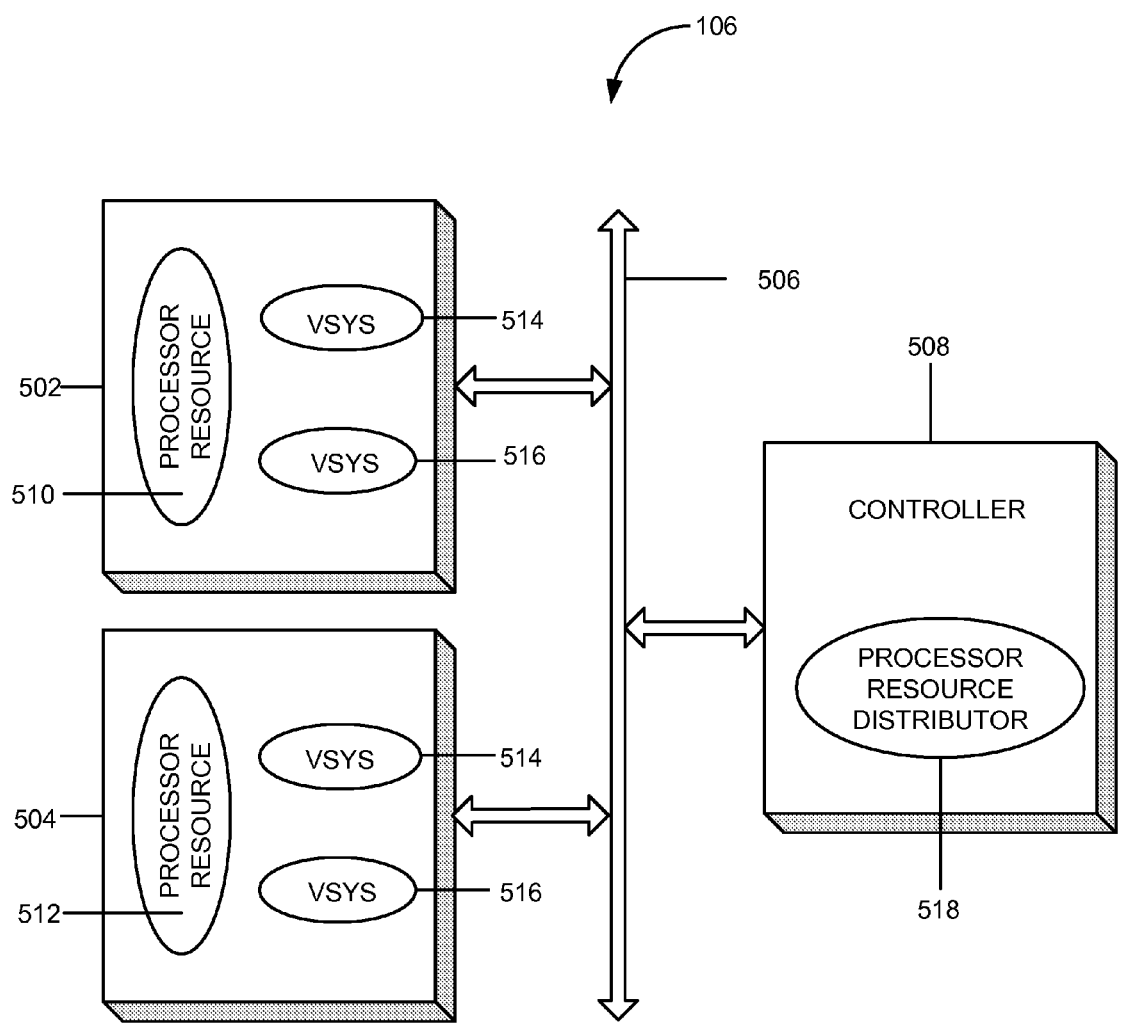
FIG. 5 is an exemplary functional block diagram of the security device of FIG. 1.

FIG. 5 illustrates a functional block diagram of security device 106. As illustrated, security device 106 may include data planes 502 and 504, a backplane 506, and a controller 508. Data planes 502/504, backplane 506, and controller 508 may reside, respectively, on SIOMs 204/206, interconnect 208 and bus 210, and management module 202.

As further shown in FIG. 5, data plane 502 may include a processor resource 510, a VSYS 514, and a VSYS 516, and a data plane 504 may include a processor resource 512, VSYS 514, and VSYS 516. Each of processor resources 510/512 may represent a predetermined amount of processing cycles that are available on each of data planes 502/504 for all VSYSs on the data plane. For example, in one implementation, processor resource 510 may include only processing cycles of flow processor 402 (FIG. 4) on data plane 502. In other implementations, processor resource 510 may include the combined processing power of all processors on data plane 502 (e.g., flow processor 402 and additional flow processors that may be included in SIOM 204).

Each of VSYSs 514/516 may include software and/or hardware for supporting trusted networks, zoning, policy, Network Address Translation (NAT), and other security operations. While each of VSYSs 514/516 is illustrated as being distributed over two data planes 502/504, in different implementations, a single VSYS may be localized at a single data plane or may be distributed over more than two data planes. Each VSYS may consume processor resources in multiple data planes.

Figure 6:
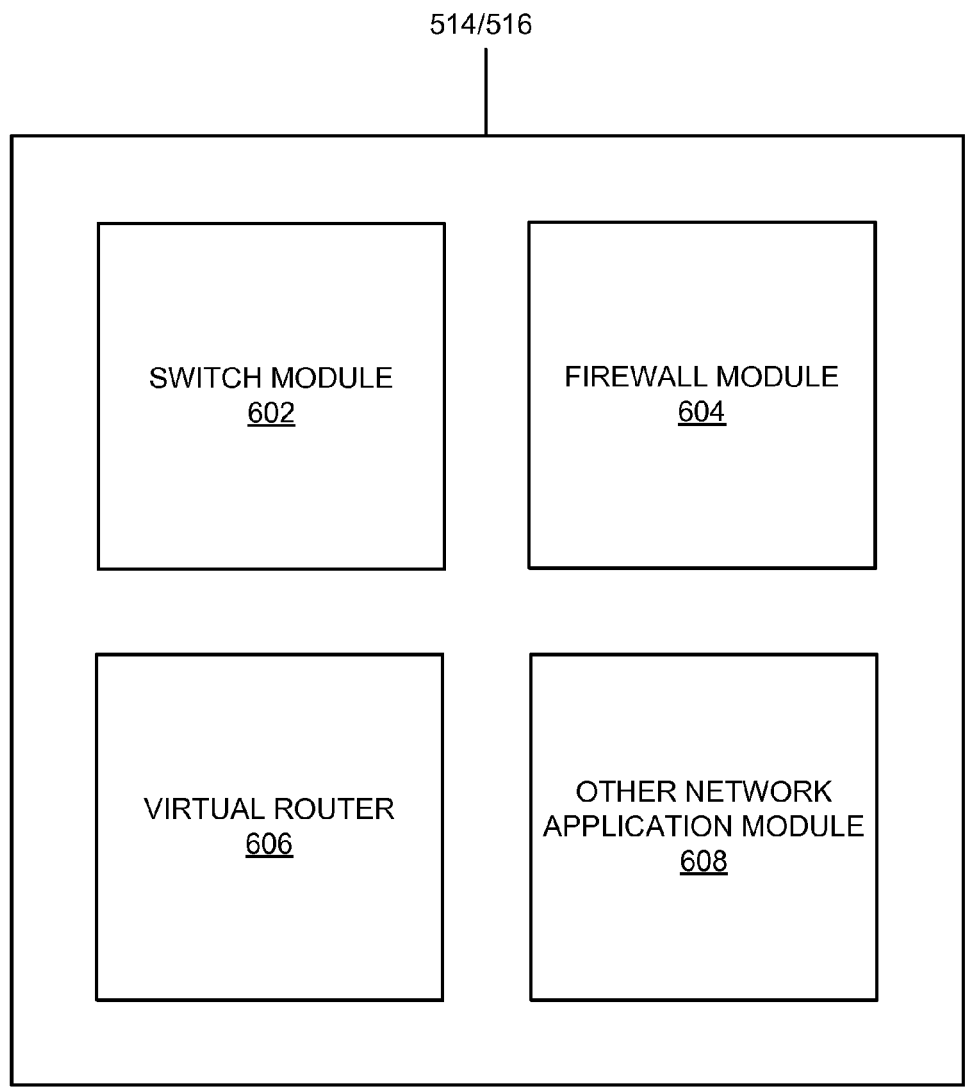
FIG. 6 is an exemplary functional block diagram of the virtual systems of FIG. 5.

FIG. 6 is a functional block diagram of each of VSYSs 514/516. As shown, each VSYS 514 or 516 may include a security zones module 602, a switch module 604, a firewall module 606, and/or a virtual router 608. In many implementations, VSYS 514/516 may include additional, fewer, or different components than the ones that are shown in FIG. 6. For example, in some implementations, VSYS 514/516 may include at least two virtual routers.

Security zones module 602 may include hardware and/or software for logically grouping interfaces, sub-interfaces, IP hosts, and/or subnets that share the same security settings in a security zone. Examples of security zones include Trusted Zone, Untrusted Zone, and Demilitarized Zone (DMZ). Switch module 604 may include hardware and/or software for mapping trusted network tags at a single physical port. If a trusted network tag is assigned to a port, switch module 604 may channel incoming packets from external network 102 (FIG. 1) based on trusted network tags. Firewall module 606 may include hardware and/or software to enable virtual private network (VPN) tunnels to operate between different security zones under a specific security policy. While FIG. 6 shows firewall module 606 as a component that is separate from security zone module 602, in other implementations, firewall module 606 may be part or a subcomponent of security zone module 602. Virtual router 608 may include hardware and/or software for running an emulation of a router within security device 106. Virtual router 608 in security device 106 may include its own routing protocol, routing tables, and routing updates.

Figure 7:
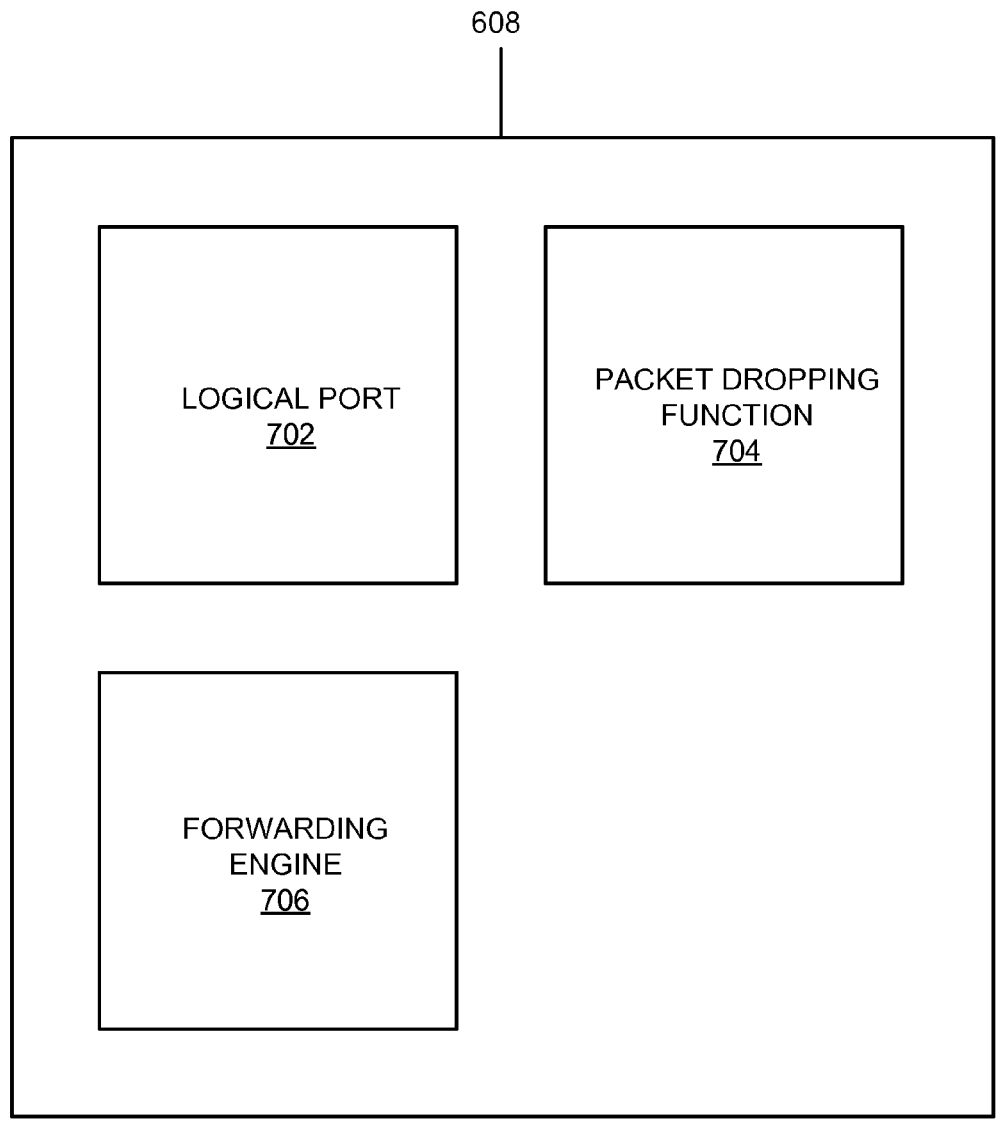
FIG. 7 shows an exemplary functional block diagram of the virtual router of FIG. 6.

FIG. 7 shows an exemplary functional block diagram of a virtual router 608. As shown, virtual router 608 may include logical ports 702, a packet dropping function 704, and a forwarding engine 706. Depending on implementation, virtual router 608 may include additional, fewer, or different components the ones shown in FIG. 7.

Logical ports 702 may include hardware and/or software for entry points and exits through which packets arrive and leave virtual router 608. Packet dropping function 704 may include hardware and/or software for receiving packets and dropping certain percentage of the received packets based on a packet drop rate. Forwarding engine 706 may include hardware and/or software for receiving packets and forwarding the received packets to one of logical ports 702.

Returning to FIG. 5, controller 508 may include hardware and/or software for managing and controlling VSYSs 514/516. As shown in FIG. 5, controller 508 may include processor resource distributor 518. Processor resource distributor 518 may determine the allotted processor time or cycles for each VSYS 514 or 516 and permit each VSYS 514 or 516 to consume up to a predetermined amount of processor time.

The above paragraphs describe system elements that are related to controlling processor use in virtual systems, such as security device 106, management module 202, SIOMs 204/206, data planes 502/504, controller 508, VSYS 514/516, and processor resource distributor 518. In different implementations, the system elements that are shown individually may be combined in different combinations.

Figure 8:
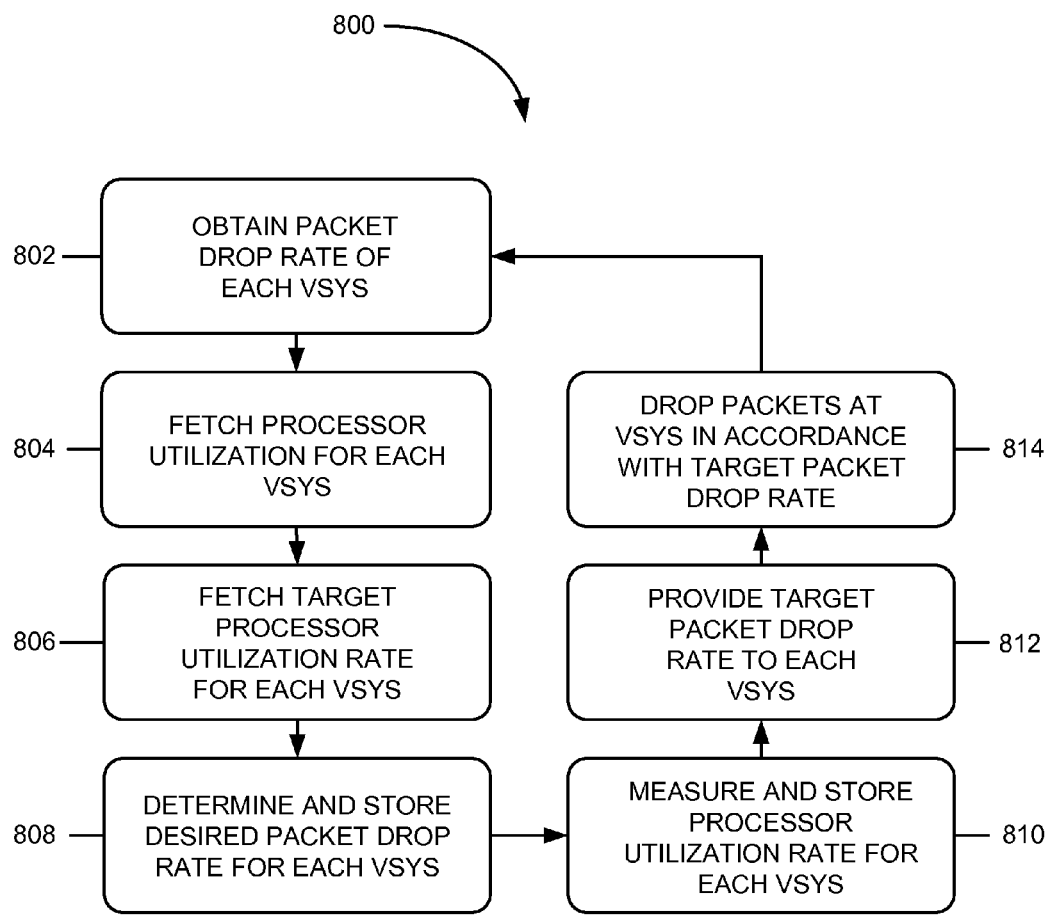
FIG. 8 shows an exemplary process for controlling processor use in the virtual systems of FIG. 5.

FIG. 8 depicts an exemplary process 800 that is capable of being performed by one or more of the system elements, to control processor use of a VSYS. In general, process 800 may iteratively control processor use of a VSYS by adjusting the packet drop rate of the VSYS based on runtime parameters about processor use. In process 800, if the processor utilization rate is too high, the packet drop rate may be increased so that VSYS may be freed from processing the packets that will be dropped. This may reduce the processor utilization rate. If the processor utilization rate is too low, the packet drop rate may be decreased so that the VSYS may dedicate more time to processing the received packets. This increases the processor utilization rate.

As shown, process 800 may begin at block 802, by obtaining the packet drop rate of each VSYS. For example, processor resource distributor 518 (FIG. 5) may obtain the packet drop rate of VSYS 514 and the packet drop rate of VSYS 516. In a VSYS, the packet drop rate, VDR(t−1), may determine the percentage of packets that the VSYS may drop. VDR(t−1) may have been determined or computed at the preceding iteration of process 800 and stored in memory (e.g., memory 304).

At block 804, a VSYS processor utilization rate, $VCU_R(t-1)$ may be fetched for each VSYS. For example, processor resource distributor 518 (FIG. 5) may fetch $VCU_R(t-1)$ from memory 304 (FIG. 3). $VCU_R(t-1)$ may have been measured at the preceding iteration of process 800, by summing up VSYS processor cycles at all data planes. In one implementation, $VCU_R(t-1)$ may include only processing cycles of flow processor 402 (FIG. 4). In other implementations, $VCU_R(t-1)$ may include the combined processing cycles of all processors on a data plane (e.g., flow processor 402 in FIG. 4 and other processors that may be included in the same SIOM). Processors in different data planes may cooperate with processors in controller 508 in measuring $VCU_R(t-1)$.

At block 806, a target processor utilization rate, $VCU_D$ may be fetched for each VSYS. The target processor utilization rate, $VCU_D$, may have been set by a user, an administrator, or security device 106. For example, an administrator may set the target processor utilization rate to 45% or some other percentage. The percentage may be stored in security device 106.

At block 808, a target packet drop rate, VDR(t), may be determined and stored for each VSYS. The determination may be based on packet drop rate VDR(t−1), the processor utilization rate $VCU_R(t-1)$, and the target processor utilization rate $VCU_D$.

Figure 9:
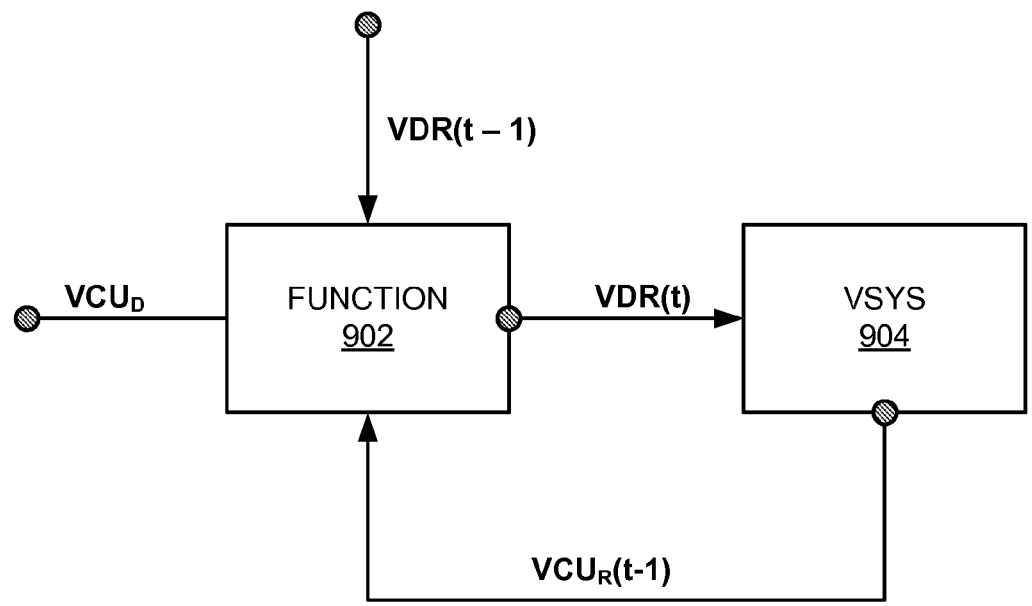
FIG. 9 illustrates the relationship between various parameters for controlling processor use in the virtual systems of FIG. 5.

FIG. 9 illustrates an exemplary relationship between target packet drop rate VDR(t), packet drop rate VDR(t−1), processor utilization rate $VCU_R(t-1)$, and target processor utilization rate $VCU_D$. In FIG. 9, VSYS 904 may represent any of VSYSs in a security device (e.g., VSYS 514 or VSYS 516). As shown, a function 902 may accept as inputs VDR(t−1), $VCU_R(t-1)$, and $VCU_D$, and output VDR(t) to VSYS 904. That is:

$$VDR(t) = \text{Function}(VDR(t-1), VCU_R(t-1), VCU_D). \quad (1)$$

Function 902 may be designed so that it effectively "punishes" a VSYS that overuses processor time and "reward" a VSYS that underutilizes processor time. That is, if $VCU_R(t-1) - VCU_D$ increases, VDR(t) may decrease. Conversely, if $VCU_R(t-1) - VCU_D$ decreases, VDR(t) may increase.

Determining VDR(t) at block 808 in accordance with expression (1) may be accomplished at a central point in security device 106 (i.e., controller 508) that is distinct from the data planes. Having a central point of control may allow security device 106 to operate with minimal configuration changes if additional data planes are added to security device 106 or if a data plane fails, and thus, may be well suited for a distributed computing system, such as security device 106.

Returning to FIG. 8, at block 810, processor utilization rate $VCU_R(t)$ may be measured and stored for each of the VSYSs for the next iteration of process 800. Because each VSYS may be distributed over multiple data planes, processor utilization for the VSYS may be computed for each data plane and summed to produce processor utilization rate $VCU_R(t)$.

Figure 10:
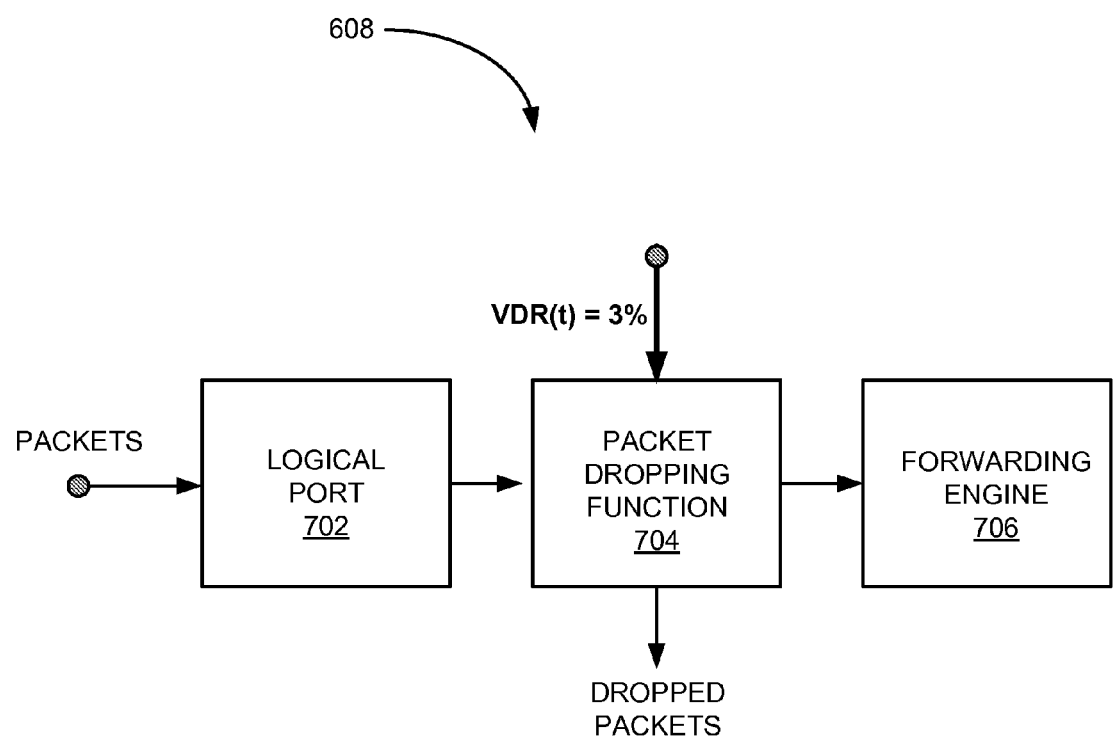
FIG. 10 illustrates the use of a parameter of FIG. 9 at the components of FIG. 7.

At block 812, the target packet drop rate VDR(t) may be provided to each VSYS, and at block 814, packets may be dropped at the VSYS in accordance with VDR(t). FIG. 10 illustrates how packets may be dropped in each of the VSYSs in accordance with VDR(t). As shown, packets may arrive at logical ports 702 and passed to packet dropping function 704. Packet dropping function 704 may drop a percentage of the received packets based on VDR(t), and pass the remaining packets to forwarding engine 706. If packet drop rate VDR(t) changes, the amount of processor time VSYS consumes may change. For example, if VDR(t) increases, the number of packets that the VSYS processes may decrease, and consequently, the VSYS may use less processor time.

Because a VSYS may change its processor time consumption by changing its packet drop rate at block 812, the VSYS may adapt to changing network traffic conditions and quickly recover from congestions. If too many packets are received due to a network congestion or a malicious attack, the VSYS may drop extra packets to prevent overloading processors. In addition, the VSYS may be driven to consume processor time close to assigned $VCU_D$, and, therefore, VSYS may not over consume the processor time at the expense of other VSYSs.

At block 814, process 800 may return to block 802 for further iterations for controlling VSYSs. Controller 508 may continue to adjust the target packet drop rate based on changing conditions. In other words, feedback control may be employed to optimize processor utilization.

In process 800, a $VCU_G$ may be defined as a sum of $VCU_D$s for all VSYSs. $VCU_G$ may then represent the maximum processor use for all VSYSs for security device 106. Because each VSYS may be driven to consume $VCU_D$, all VSYSs in security device 106 may be collectively driven to consume $VCU_G$ and maximize the global processor utilization.

Example

The following example illustrates the process for controlling processor use in accordance with implementations described above reference FIG. 5. The example is also consistent with the exemplary process described above with reference to FIG. 8.

In the example, as illustrated in FIG. 5, security device 106 includes data plane 502 and 504 and that each data plane 502/504 supports VSYS 514 and VSYS 516. Assume that each data plane 502 or 504 provides the same amount of processor resource and that the target processor utilization rates for VSYS 514 and 516 are $VCU_{D1}$=50% and $VCU_{D2}$=50%, respectively. Also assume that at time t, the actual processor utilization rates and the packet drop rates for VSYS 514 and 516 are $VCU_{R1}(t-1)$=48%, $VCU_{R2}(t-1)$=48%, $VDR_1(t-1)$=5%, and $VDR_2(t-1)$=5%. It is possible for $VCU_{R1}(t-1)+VCU_{R2}(t-1)$ to be less than 100%, because data planes 502 and 504 may ration processor time to other processes. In addition, further assume that function 704 for calculating the target drop rate for VSYS 514 is provided by the following expression:

$$VDR_1(t)=VDR_1(t-1)-VCU_{D1}+VCU_{R1}(t-1), \quad (2)$$

and the target packet drop rate for VSYS 516 is provided by:

$$VDR_2(t)=VDR_2(t-1)-VCU_{D2}+VCU_{R2}(t-1). \quad (3)$$

To control processor use, $VDR_1(t-1)$, $VCU_{D1}$, $VCU_{R1}(t-1)$, $VDR_2(t-1)$, $VCU_{D2}$, and $VCU_{R2}(t-1)$ may be fetched from memory (e.g., memory 304). From expressions (2) and (3), the desired packet drop rates for VSYS 514 and VSYS 516 may be obtained as: $VDR_1(t)=VDR_2(t)$=5%−50%+48%=3%. The packet drop rates for VSYS 514 and VSYS 516 may be stored for the next iteration of the control process. In addition, the processor utilization rates may be measured and stored for the next iteration of the control process.

VSYS 514 and VSYS 516 may use the target packet drop rates $VDR_1(t)$ and $VDR_2(t)$, respectively. For example, as illustrated in FIG. 10, virtual router 608 in VSYS 514 or VSYS 516 may drop 3% of the received packets in accordance with VDR(t). With the reduced packet drop rates, VSYS 514 and VSYS 516 may use more processor time to handle additional packets. The increased process utilization, along with the stored values of $VDR_1(t)$, $VCU_{D1}$, $VCU_{R1}(t)$, $VDR_2(t)$, $VCU_{D2}$, and $VCU_{R2}(t)$, may fed into the next iteration of the control process at time t+1. The processing may then continue, thereby optimizing processor utilization.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to processes illustrated in FIG. 8, the order of the blocks may be modified in other implementations. For example, block 810 may be performed after block 812 or 814. In addition, non-dependent blocks may represent acts that can be performed in parallel to other blocks, such as blocks 802, 804 and 806.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   receiving, via one or more servers associated with a virtual system, packets at the virtual system;
   obtaining, by the one or more servers, a packet drop rate, a processor utilization rate, and a target processor utilization rate associated with the virtual system during a time period, where the processor utilization rate and the target processor utilization rate are related to a sum of a number of processor cycles, during the time period, of each at least one processor in each of a plurality of data planes associated with the virtual system;
   determining, via the one or more servers, a target packet drop rate for the virtual system for a subsequent time period, where the target packet drop rate is based on the packet drop rate, the processor utilization rate, and the target processor utilization rate; and
   dropping, via the one or more servers and during the subsequent time period, a portion of the received packets at the virtual system based on the target packet drop rate.

2. The method of claim 1, where determining a target packet drop rate includes:
   computing the target packet drop rate based on a function in which the target packet drop rate is greater than the packet drop rate if the processor utilization rate is greater than the target processor utilization rate.

3. The method of claim 2, where dropping a portion of the received packets includes:
   increasing a utilization of a processor, of the least one processor in each of the plurality of data planes associated with the virtual system, when the target packet drop rate is less than the packet drop rate; and decreasing the utilization of the processor when the target packet drop rate is greater than the packet drop rate.

4. The method of claim 1, further comprising:
storing the target packet drop rate for a next iteration of the receiving, the obtaining, the determining, and the dropping.

5. The method of claim 1, further comprising:
determining a new processor utilization rate for a next iteration of the receiving, the obtaining, the determining, and the dropping.

6. A device comprising:
a memory;
ports for receiving and sending packet to and from internal and external networks; and
control logic to:
   determine a target packet drop rate of a virtual system, for a current time period, based on an amount of processor resources consumed by the virtual system and based on runtime parameters, where the processor resources relate to a sum of a number of processor cycles, during the time period, of each at least one processor resource in each of a plurality of data planes associated with the virtual system; and
the virtual system that uses at least one of the processor resources, the virtual system to:
   receive packets during the current time period, and
   drop, during the current time period, a portion of the received packets based on the target packet drop rate.

7. The device of claim 6, where the virtual system includes a virtual router and at least one of:
security zones; or
trusted networks.

8. The device of claim 7, where the virtual system further includes at least one firewall between the security zones.

9. The device of claim 7, where the security zones include at least one of:
a trusted zone,
an untrusted zone, or
a demilitarized zone.

10. The device of claim 7, where the virtual router includes at least one of:
a routing table,
a logical interface, or
route updating logic.

11. The device of claim 6,
where each of the plurality of data planes includes a processor resource not included in other ones of the plurality of data planes.

12. The device of claim 11, further including:
a backplane that interconnects the control logic and the plurality of data planes for forwarding packets.

13. The device of claim 11, where each of the plurality of data planes is associated with a same set of virtual systems.

14. The device of claim 6, where the control logic is further to:
increase a processor utilization rate of the at least one processor resource when the target packet drop rate is greater than a packet drop rate, and
decrease the processor utilization rate of the at least one processor resource when the target packet drop rate is less than the packet drop rate.

15. The device of claim 6, where the runtime parameters include:
a target utilization rate of the at least one processor resource for the virtual system and a past packet drop rate of the virtual system.

16. The device of claim 15, where the control logic includes a function that determines the target packet drop rate of the virtual system based on a difference between a utilization rate of the at least one processor resource and the target utilization rate of the at least one processor resource.

* * * * *